United States Patent
Isurin et al.

(10) Patent No.: US 9,906,169 B1
(45) Date of Patent: Feb. 27, 2018

(54) DC-AC CONVERSION CIRCUIT HAVING A FIRST DOUBLE ENDED DC PULSE STAGE AND A SECOND AC STAGE

(71) Applicant: VANNER, INC., Hilliard, OH (US)

(72) Inventors: Alexander Isurin, Dublin, OH (US); Alexander Cook, Dublin, OH (US)

(73) Assignee: VANNER, INC., Hilliard, OH (US)

( * ) Notice: Subject to any disclaimer, the term of this patent is extended or adjusted under 35 U.S.C. 154(b) by 0 days.

(21) Appl. No.: 15/466,470

(22) Filed: Mar. 22, 2017

Related U.S. Application Data

(60) Continuation of application No. 15/004,433, filed on Jan. 22, 2016, now Pat. No. 9,692,313, which is a
(Continued)

(51) Int. Cl.
| | |
|---|---|
| *H02M 7/72* | (2006.01) |
| *H02M 1/44* | (2007.01) |
| *H02M 3/28* | (2006.01) |

(52) U.S. Cl.
CPC ............. *H02M 7/72* (2013.01); *H02M 1/44* (2013.01); *H02M 3/28* (2013.01)

(58) Field of Classification Search
CPC ........ H02M 3/005; H02M 3/22; H02M 3/335; H02M 3/33576; H02M 3/3384;
(Continued)

(56) References Cited

U.S. PATENT DOCUMENTS

| | | | |
|---|---|---|---|
| 5,355,294 A | 10/1994 | De Doncker et al. | |
| 5,442,534 A * | 8/1995 | Cuk ................... | H02M 3/33561 363/16 |

(Continued)

FOREIGN PATENT DOCUMENTS

| | | |
|---|---|---|
| EP | 0475345 A2 | 3/1992 |
| WO | 2009120793 A2 | 10/2009 |

OTHER PUBLICATIONS

Extended European Search Report, Application EP16153005, dated Sep. 12, 2016.
(Continued)

*Primary Examiner* — Yemane Mehari
(74) *Attorney, Agent, or Firm* — James R. Eley; Ronald J. Koch; Eley Law Firm Co. LPA

(57) ABSTRACT

A voltage converter system includes a first DC-AC voltage converter that converts a first DC voltage signal to a first AC voltage signal. A DC link converts the first AC voltage signal to a second DC voltage signal. A second DC-AC voltage converter converts the second DC voltage signal to a second AC voltage signal. In another configuration a DC-AC voltage converter converts a DC voltage signal to a first AC voltage signal. An AC-AC voltage converter converts the first AC voltage signal to a second, lower-frequency AC voltage signal. In yet another configuration a first voltage converter portion converts a DC voltage signal to pulses of DC voltage. A second voltage converter portion converts the pulses of DC voltage to a relatively low-frequency AC voltage signal. The voltage converter system is selectably configurable as a DC-AC voltage converter or an AC-DC voltage converter.

5 Claims, 9 Drawing Sheets

Related U.S. Application Data division of application No. 14/209,282, filed on Mar. 13, 2014, now abandoned.

(60) Provisional application No. 61/785,958, filed on Mar. 14, 2013.

(58) Field of Classification Search
CPC ........ H02M 7/06; H02M 7/48; H02M 7/4807; H02M 7/515; H02M 7/537; H02M 7/72; H02M 2001/0045; H02M 2001/0067; H02M 2001/007; H02M 2001/0074; H02M 2001/123; H02M 1/10; H02M 1/12; H02M 1/14; H02M 1/15; H02M 2003/1557; H02M 5/458; H02J 3/385; H02K 47/18; H02K 47/26
USPC ........ 363/13, 14, 78, 84, 89, 90, 95, 97, 98, 363/157, 170, 171, 176
See application file for complete search history.

(56) References Cited

U.S. PATENT DOCUMENTS

| | | | |
|---|---|---|---|
| 5,907,223 | A | 5/1999 | Gu et al. |
| 6,094,366 | A | 7/2000 | Kalfhaus |
| 6,330,170 | B1 * | 12/2001 | Wang ............... H02J 9/062 363/17 |
| 8,072,785 | B2 | 12/2011 | Nakahori |
| 8,164,275 | B2 * | 4/2012 | Doudousakis ........ H02M 3/156 315/224 |
| 8,212,492 | B2 | 7/2012 | Lam et al. |
| 9,692,313 | B1 * | 6/2017 | Isurin ............... H02M 5/458 |
| 2002/0181262 | A1 | 12/2002 | Wade |
| 2006/0012348 | A1 | 1/2006 | Zhao et al. |
| 2006/0062034 | A1 | 3/2006 | Mazumder et al. |
| 2006/0152085 | A1 | 7/2006 | Flett et al. |
| 2006/0279968 | A1 * | 12/2006 | Iida ............... H02M 7/4807 363/21.01 |
| 2008/0192510 | A1 | 8/2008 | Falk |
| 2008/0212348 | A1 | 9/2008 | Hallak |
| 2009/0086520 | A1 | 4/2009 | Nishamura |
| 2010/0019578 | A1 | 1/2010 | Schreiber |
| 2010/0284208 | A1 | 11/2010 | Nguyen |
| 2011/0188273 | A1 | 8/2011 | Pansier et al. |
| 2012/0063184 | A1 | 3/2012 | Mazumder |
| 2012/0146526 | A1 | 6/2012 | Lam et al. |
| 2012/0290145 | A1 | 11/2012 | Joshi et al. |
| 2013/0039104 | A1 | 2/2013 | Sharma |
| 2014/0112025 | A1 | 4/2014 | Mueller et al. |
| 2014/0211521 | A1 | 7/2014 | Mazumder |
| 2014/0268927 | A1 * | 9/2014 | Isurin ............... H02M 7/06 363/35 |

OTHER PUBLICATIONS

Ravindra Ambatipudi et al., "Deriving Dual-Output Power Supplies" Cover Story, Electronics Engineer, Feb. 1, 1999, retrieved by the EPO examiner from the Internet on Sep. 1, 2016 from www.eetasia.com.

Qun Zhao et al., "Improving Performance of Continuous Current Mode Boost Converters for Power Factor Correction", 32nd Annual IEEE Power Electronics Specialists Conference, PESC 2001, Conference Proceedings, Vancouver, CA, Jun. 17-21, 2001; [Annual Power Electronics Specialists Conference], New York, NY: IEEE, US, vol. 2, Jun. 17, 2001, pp. 642-647.

Slobodan Cuk et al., "Advances in Switched-Mode Power Conversion Part I", IEEE Transactions on Industrial Electronics, IEEE Service Center, Piscataway, NJ, USA, vol. 54, No. 1, Feb. 1, 1983, pp. 10-19.

Partial European Search Report, Application EP16153005, dated May 3, 2016.

Partial European Search Report, Application EP14159699, dated Aug. 6, 2015.

Extended European Search Report, Application EP14159699, dated Oct. 21, 2015.

* cited by examiner

US 9,906,169 B1

DC-AC CONVERSION CIRCUIT HAVING A FIRST DOUBLE ENDED DC PULSE STAGE AND A SECOND AC STAGE

This application is a continuation of U.S. patent application Ser. No. 15/004,433, filed Jan. 22, 2016, which is a division of U.S. patent application Ser. No. 14/209,282, filed Mar. 13, 2014, which claims priority to U.S. provisional application No. 61/785,958, filed Mar. 14, 2013, the entire contents of each being hereby incorporated by reference.

FIELD

The present invention relates generally to voltage converter systems, in particular to systems adapted to convert direct-current (DC) voltages to alternating-current (AC) voltages and vice versa.

BACKGROUND

A DC-AC voltage converter is an electrical system that changes a DC voltage to an AC voltage. The converted AC voltage may have any desired voltage level, waveform and frequency with the use of appropriate transformers, switching, filtering and control circuits. DC-AC voltage converters are used in a wide range of applications, from small switching power supplies in electronic devices such as computers to large electric utility high-voltage direct current applications that transport bulk power. DC-AC voltage converters are also commonly used to supply AC power from DC sources such as solar panels or batteries.

FIG. 1 shows a typical prior art DC-AC voltage converter 10, which operates at a relatively low frequency. Voltage converter 10 is relatively simple, but it suffers from significant disadvantages. A first disadvantage is cost, because it uses a low-frequency transformer 12 that requires a relatively large amount of copper for transformer windings. In recent years the cost of copper has increased, while the cost of power semiconductors has decreased. This trend is expected to continue. In addition, a low-frequency transformer has relatively low efficiency when it is configured with a relatively high winding turns ratio and is used for voltage step-up. An example of such configurations is a DC-AC voltage converter with a step-up transformer having a turns ratio of about 19:1 or more and a relatively low input voltage power source, for example about 10 to 20 volts DC.

SUMMARY

Given the foregoing, it is desirable to perform voltage conversion with a relatively high-frequency transformer driven by suitable power switching semiconductors. In one embodiment the present invention is a DC-AC voltage converter capable of operating with a relatively low DC voltage source input, such as from a battery power supply.

In some embodiments of the present invention the DC-AC voltage converter may be bidirectional, thereby capable of receiving an AC voltage signal and generating an output DC voltage signal. This arrangement is useful, for example, for charging a battery from an AC grid.

Preferably, a transformer is utilized to provide electrical isolation for DC-AC and AC-DC conversion. For example, an isolation transformer may be used between a DC voltage input (e.g., a battery) and an AC voltage output. The voltage converters of the present invention may be generally divided into several types according to the type of transformer selected. For example, the isolation transformers may be relatively low-frequency, on the order of 50/60 Hertz (Hz). Preferably, the isolation transformers are relatively high-frequency, on the order of tens or more kilohertz (kHz).

An aspect of the present invention is a voltage converter system that includes a first, high-frequency, DC-AC voltage converter configured to receive a first DC voltage signal and generate a first AC voltage signal. A DC link is configured to receive the first AC voltage signal and convert the first AC voltage signal to a second DC voltage signal. A second DC-AC voltage converter is configured to receive the second DC voltage signal and generate a second AC voltage signal.

Another aspect of the present invention is a voltage converter system that includes a DC-AC voltage converter configured to receive a DC voltage signal and generate a first, relatively high-frequency, AC voltage signal. An AC-AC voltage converter is configured to receive the first AC voltage signal and generate a second AC voltage signal. The frequency of the second AC voltage signal is preferably lower than the frequency of the first AC voltage signal.

Yet another aspect of the present invention is a voltage converter system that includes a first voltage converter portion that is configured to receive a DC voltage signal and convert the DC voltage signal to pulses of DC voltage. A second voltage converter portion is configured to receive the pulses of DC voltage and convert the pulses of DC voltage to a relatively low-frequency AC voltage signal. The voltage converter system is selectably configurable as a DC-AC voltage converter or an AC-DC voltage converter. In some embodiments of the present invention the first voltage converter portion includes a Ćuk-type voltage converter and a single-ended primary inductor converter (SEPIC) voltage converter, the Ćuk-type voltage converter and the SEPIC voltage converter being electrically combined to operate cooperatively.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
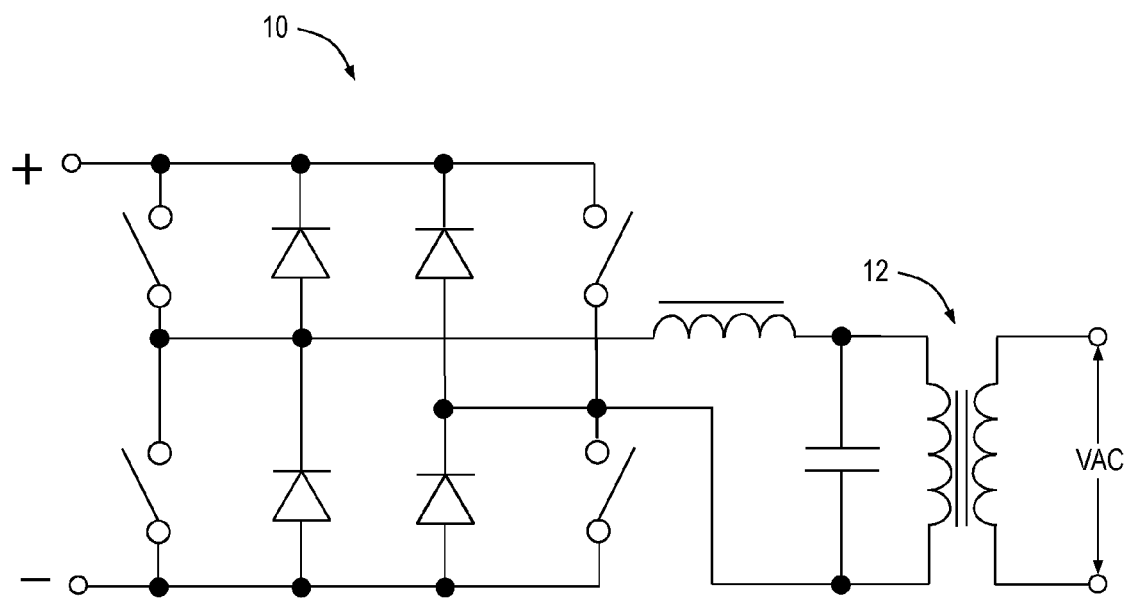
FIG. 1 is an electrical schematic diagram of a typical prior art DC-AC voltage converter.
Figure 2:
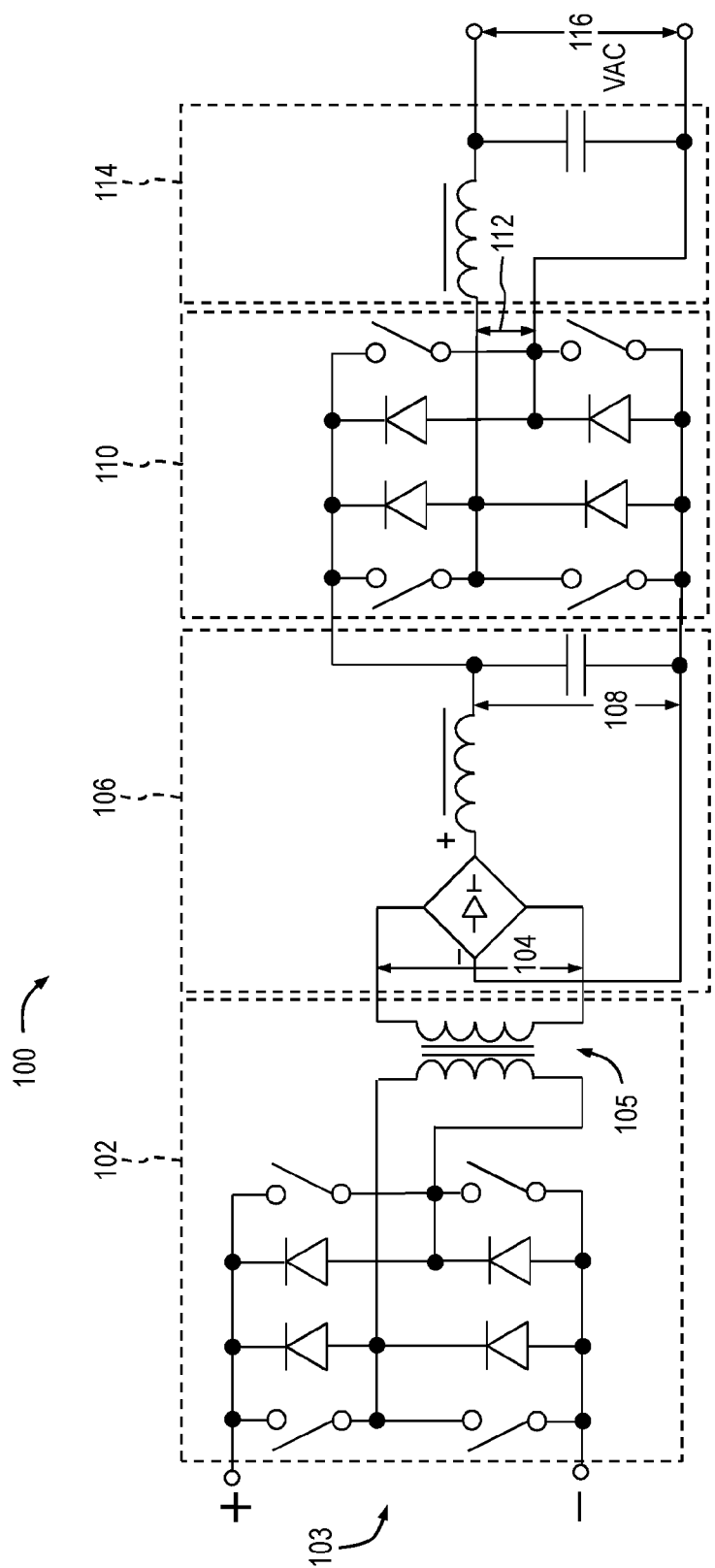
FIG. 2 is an electrical schematic diagram of a DC-AC voltage converter system with a DC link according to an embodiment of the present invention.

FIG. 2 shows a DC-AC voltage converter system 100 having a first, high-frequency, DC-AC voltage converter 102 according to an embodiment of the present invention. First DC-AC voltage converter 102 receives at an input 103 a first DC voltage signal. A first, relatively high-frequency, AC voltage signal 104 generated by a transformer 105 of first DC-AC voltage converter 102 is supplied to a DC-link 106 that converts the first AC voltage signal to a second DC voltage signal 108. Second DC voltage signal 108 is coupled to a second DC-AC voltage converter 110 that converts second DC voltage signal 108 to a second AC voltage signal, output AC voltage signal 112. Output 112 may have either low-frequency components, high-frequency components, or both low- and high-frequency components.

An optional electrical filter 114 provides filtering of AC output voltage signal 112 to remove high-frequency components and/or limit electromagnetic interference (EMI) caused by the AC output voltage signal, resulting in a filtered AC output voltage signal 116. For certain applications where power quality is not a significant issue (such as a motor drive, as one example) a filter 114 configured to remove high-frequency components may be omitted.

Figure 3:
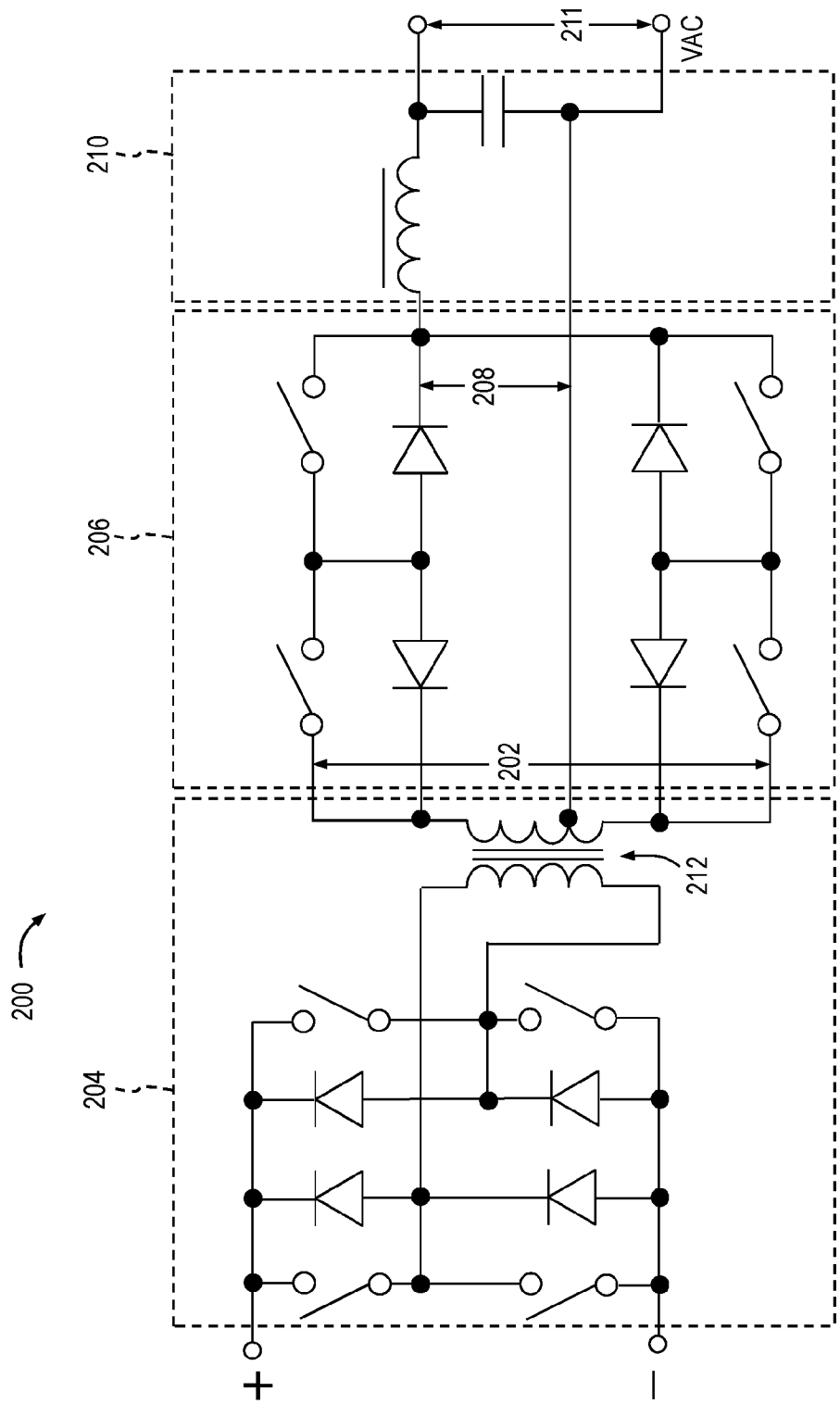
FIG. 3 is an electrical schematic diagram of a DC-AC voltage converter system without a DC link according to another embodiment of the present invention.

FIG. 3 shows a DC-AC voltage converter system 200 according to another embodiment of the present invention. A first AC voltage signal 202 generated by a DC-AC voltage converter 204 is supplied to an AC-AC voltage converter 206 that converts the first AC voltage signal to a second AC voltage signal, output AC voltage signal 208. An electrical filter 210 provides filtering of AC output voltage signal 208 to reduce EMI caused by the AC output voltage signal, resulting in a filtered AC output voltage signal 211. First AC voltage signal 202 is a relatively high-frequency voltage signal, while second AC voltage signal 208 is a relatively low-frequency voltage signal output from voltage converter system 200.

With reference to FIGS. 2 and 3 together, voltage converter system 100 provides relatively efficient voltage conversion, but compared to voltage converter system 200 it is more complex and more expensive to produce. However, the performance of voltage converter system 200 depends in part upon the operating conditions of a transformer 212. FIG. 3 shows a topology wherein transformer 212 operates under regulation, with a relatively high turns ratio. In this case efficiency of voltage converter system 200 will be less and the voltage converter system will generate a relatively high level of EMI on the AC output voltage signal 208. Consequently, EMI filter 210 may require a number of relatively expensive components in order to be effective.

Figure 4:
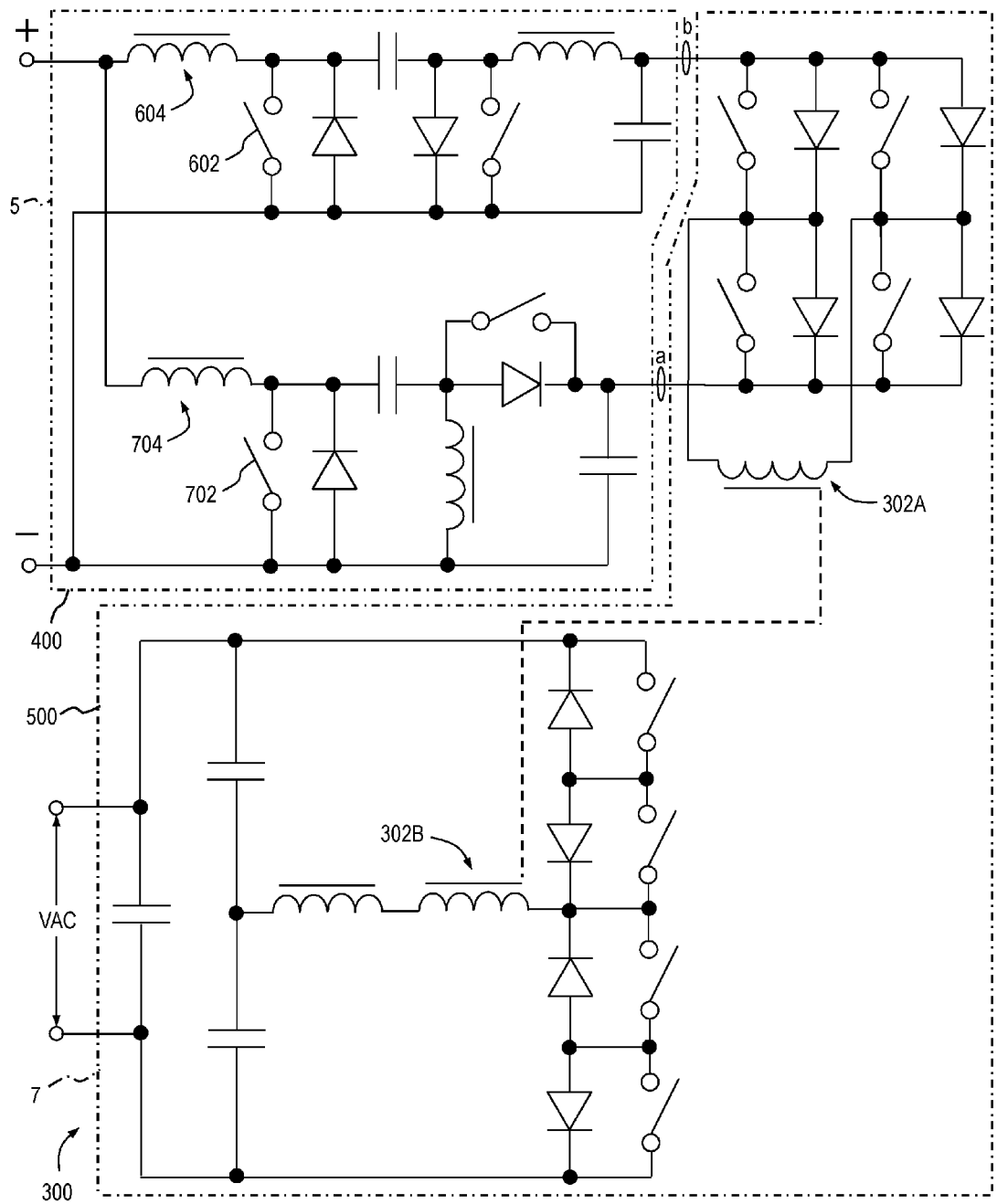
FIG. 4 is an electrical schematic diagram of a voltage converter configurable for operation as either a DC-AC or an AC-DC voltage converter according to yet another embodiment of the present invention.

FIG. 4 shows a schematic diagram of a voltage converter system 300 according to yet another embodiment of the present invention. Voltage converter system 300 is configurable for operation as either a DC-AC or an AC-DC voltage converter and is suitable for low DC input voltages (e.g., on the order of about 8-16 VDC) at power levels of up to several kilowatts. Furthermore, voltage converter system 300 overcomes the disadvantages discussed above. Voltage converter system 300 may be implemented with a relatively low number of active semiconductor switches. In addition, a transformer 302 (comprising windings 302A, 302B) functions under extremely benign conditions (i.e., conditions favorable in that root-mean-square (RMS) current and RMS voltage are favorable for relatively low transformer losses). Finally, there is only a low level of EMI on the AC side.

Figure 5:
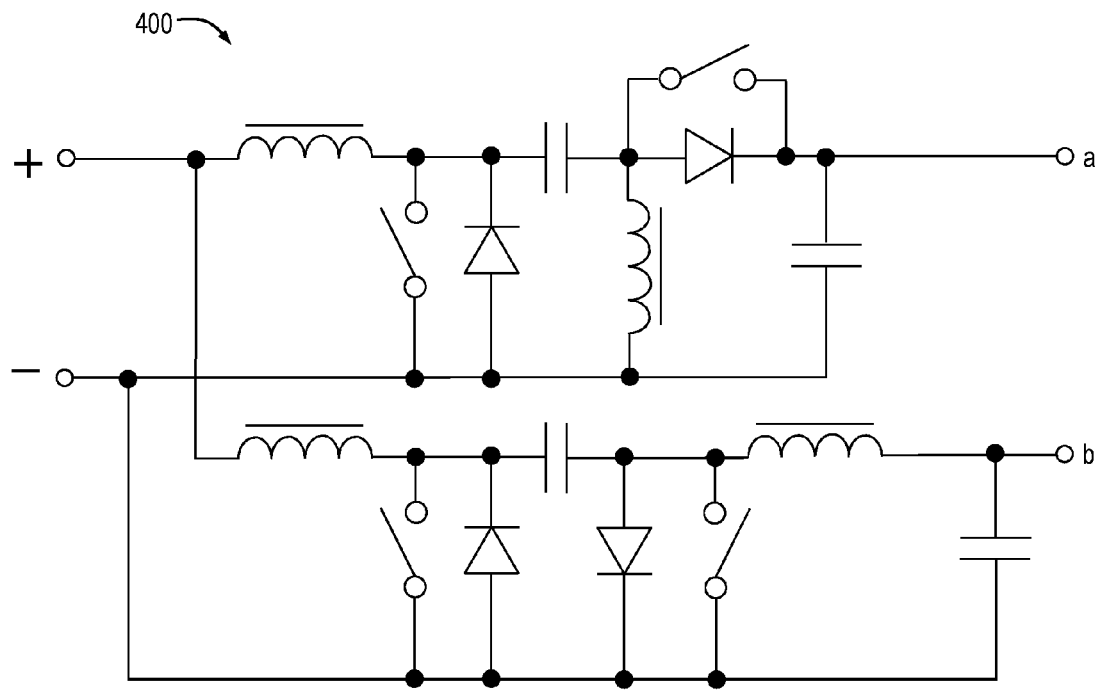
FIG. 5 is an electrical schematic diagram showing details of a first portion of the voltage converter of FIG. 4.
Figure 6:
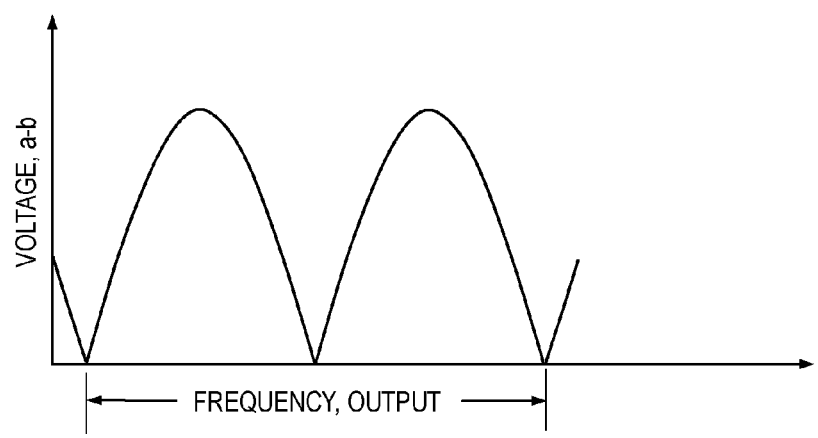
FIG. 6 is a graph showing the general waveform of certain electrical signals generated by the circuit of FIG. 5.
Figure 7:
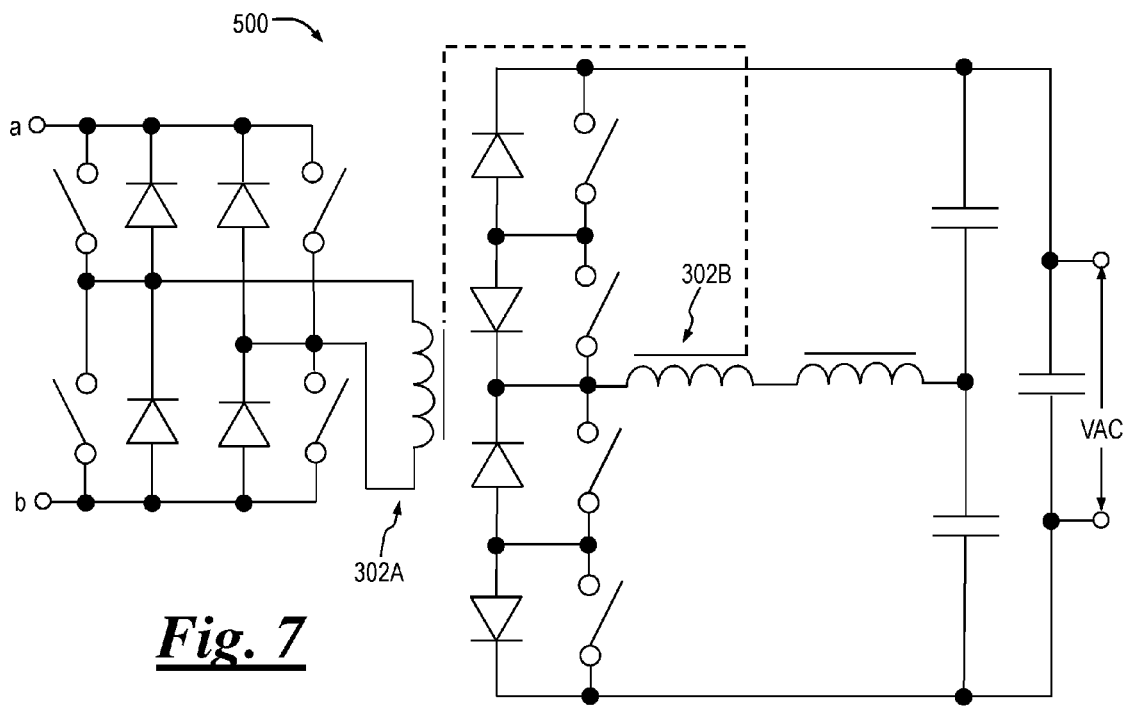
FIG. 7 is an electrical schematic diagram showing details of a second portion of the voltage converter of FIG. 4.

The topology of voltage converter system 300 may be divided into two portions for the purpose of explanation. A first voltage converter portion, 400 shown in FIG. 5, provides pulses of DC voltage regulated from 0 volts to a predetermined maximum voltage, with a generally half-sinusoidal waveform as shown in FIG. 6. A second voltage converter portion 500, shown in FIG. 7, provides electrical isolation and conversion from the pulsed DC voltage of FIG. 6 to a predetermined relatively low-frequency AC voltage signal including, without limitation, about 120 VAC at a frequency of about 50/60 Hz.

With continued reference to FIG. 5, this power stage is a combination of two types of power converters. The first is a Ćuk-type voltage converter 600, shown in FIG. 8. The other is a single-ended primary inductor converter (SEPIC) voltage converter 700, shown in FIG. 9. The operational details of these voltage converters are well-known in the art and thus will not be further elaborated upon here. Both voltage converters have a number of common features. For example, each is capable of providing an output voltage from zero to several times higher than the input voltage. In addition, both are bi-directional.

One important difference between the Ćuk-type voltage converter and the SEPIC-type voltage converter is that the Ćuk-type voltage converter reverses the polarity of the input voltage while the SEPIC-type voltage converter does not. With reference again to FIG. 5, these characteristics may be utilized to advantage, to provide an output voltage from an appropriately paired and electrically combined Ćuk-type voltage converter and SEPIC-type voltage converter that is about twice the output voltage available from each voltage converter individually, each voltage converter providing about half of output power delivered by the electrically combined voltage converters. A further advantage of this arrangement is that doubling the output voltage in this manner aids to reduce the required primary-to-secondary winding turns ratio of isolation transformer 302.

Figure 8:
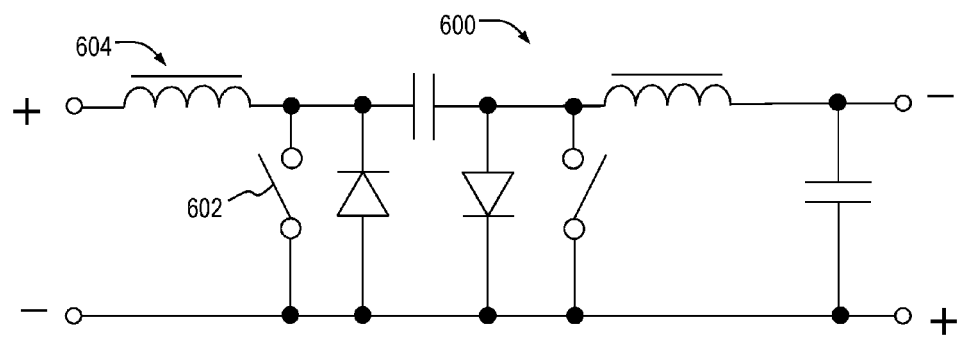
FIG. 8 is an electrical schematic diagram of a Ćuk-type voltage converter.
Figure 9:
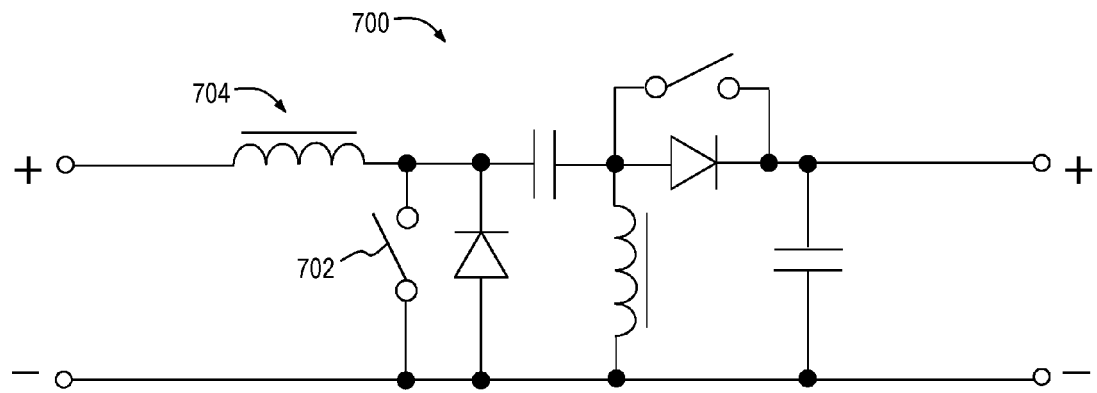
FIG. 9 is an electrical schematic diagram of a single-ended primary inductor converter voltage converter.
Figure 10:
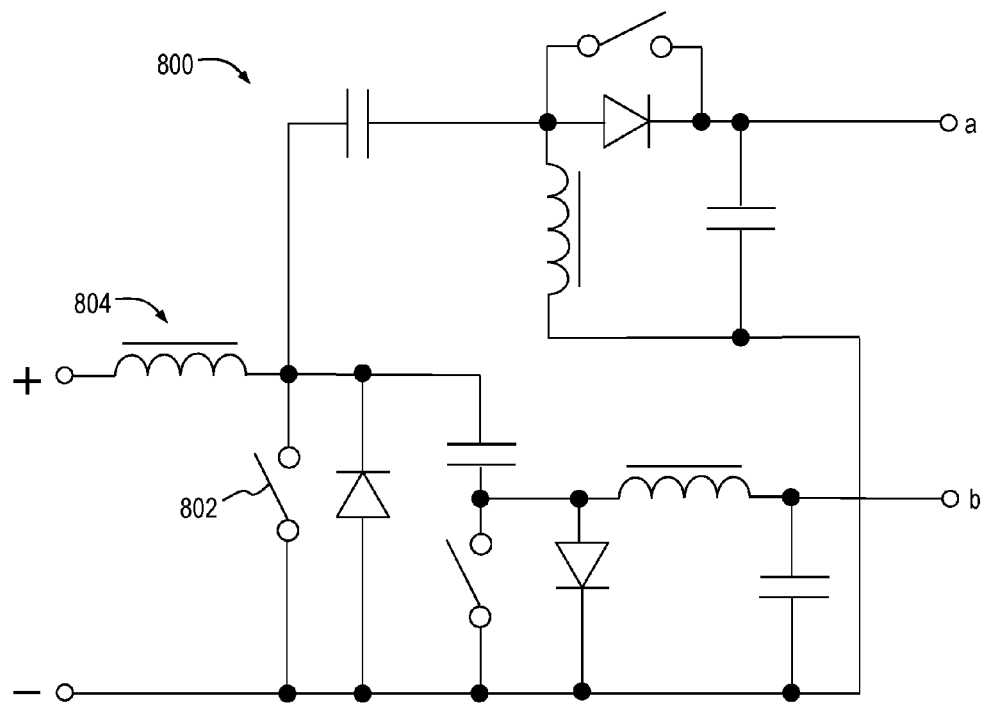
FIG. 10 is an electrical schematic diagram of the voltage converters of FIGS. 8 and 9 electrically combined together in a new arrangement in accordance with an embodiment of the present invention, providing for a reduced total component count.

With reference now to FIGS. 8 and 9 together, switches 602, 702 respectively exhibit substantially the same operating characteristics. Likewise, inductors 604, 704 in FIGS. 8 and 9 respectively exhibit substantially the same operating characteristics. Therefore, these components can be combined in an appropriately paired Ćuk-type voltage converter and SEPIC-type voltage converter to form the circuit 800 shown in FIG. 10. In FIG. 10, switch 802 replaces switches 602, 702 while inductor 804 replaces the inductors 604, 704. Thus, switch 802 and inductor 804 are common to both the Ćuk-type voltage converter and the SEPIC voltage converter. This results in one less active switch and one less inductor in an appropriately paired Ćuk-type voltage converter and SEPIC-type voltage converter, thereby reducing voltage converter cost. Circuit 800 may be substituted for circuit 400 in the system of FIG. 4.

Figure 11:
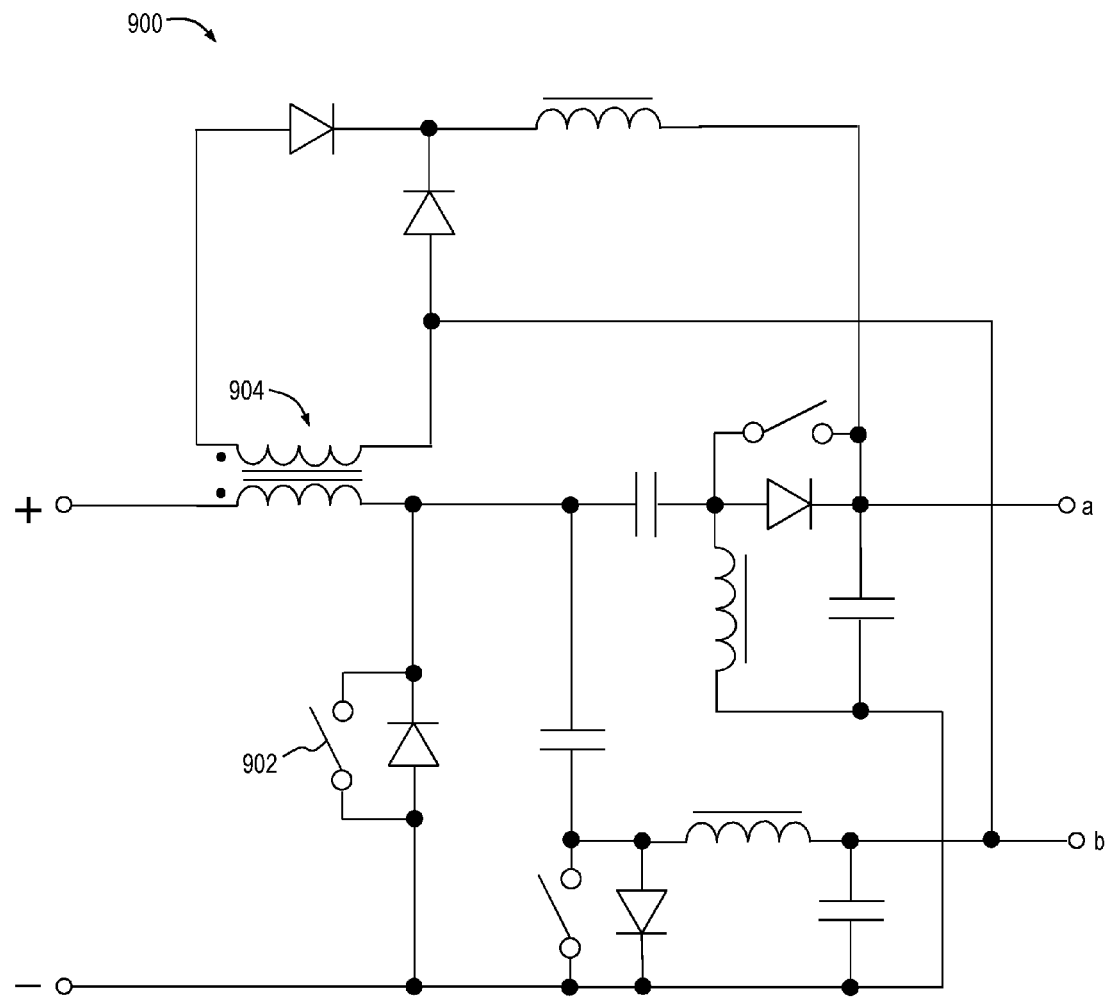
FIG. 11 is an electrical schematic diagram of the voltage converter of FIG. 10 incorporating several refinements.

Ćuk and SEPIC voltage converters have one common disadvantage in that neither provide forward power conversion. Rather, they use passive components such as capacitors and inductors for energy storage. Consequently, the efficiency of these voltage converters depends very much on the quality factor of the aforementioned passive components. The quality factor of capacitors are generally good, but the quality factor of inductors are often less than desirable and often tend to worsen under high-current and low-voltage operating conditions. To reduce losses and increase efficiency, system 800 may be modified, replacing inductor 804 with an inductor/transformer 904, as shown in the circuit 900 of FIG. 11. In this embodiment of the present invention when a switch 902 begins conducting forward power conversion will be provided by inductor/transformer 904, thereby increasing the efficiency of system 900 in comparison to system 800 of FIG. 10. Circuit 900 may be substituted for circuit 400 in the system of FIG. 4.

With reference again to FIG. 7, voltage converter portion 500 comprises a power stage which will provide isolation between the low voltage side and the high voltage side. This topology is a series-resonant voltage converter, which is bi-directional. The power transformer 302 in this case works under substantially benign conditions, with a generally trapezoidal voltage wave form and a generally sinusoidal current wave form. The transformer 302 leakage inductance is part of the resonant inductor or, optionally, may comprise the entire resonant inductor. All these features aid to keep efficiency and the commutation frequency as high as possible. This reduces the transformer size and reduces its cost, as well as total inverter cost, reducing the cost of EMI filters if used.

Figure 12:
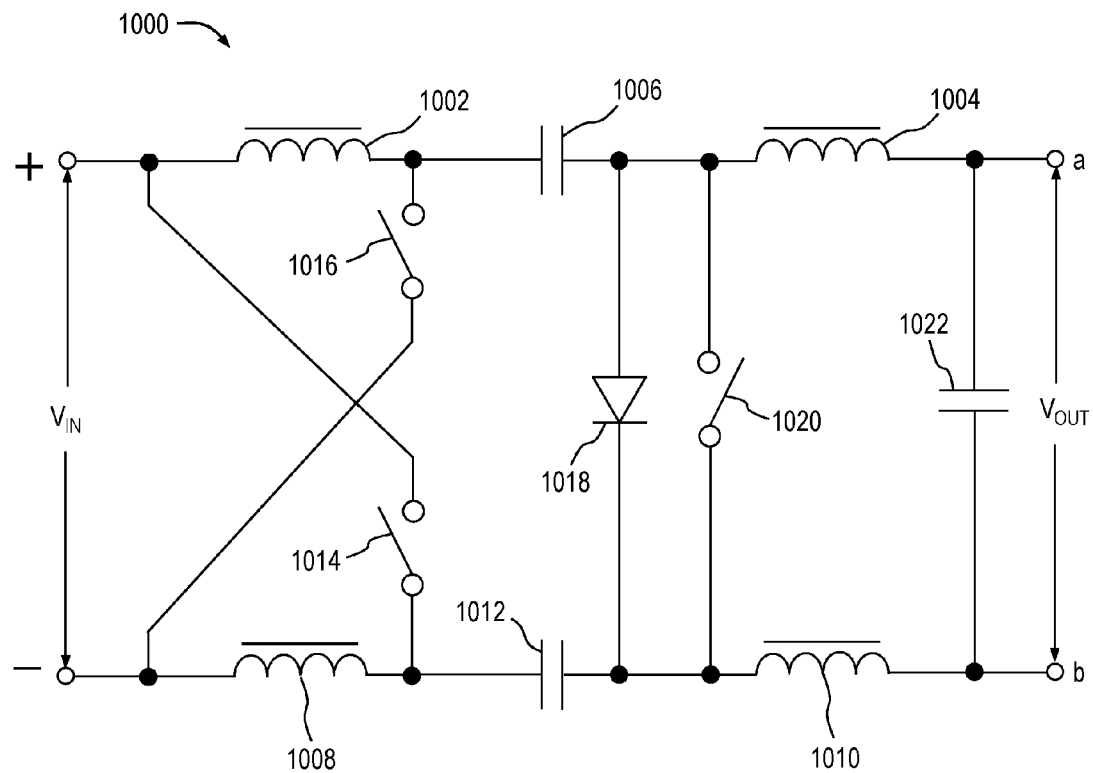
FIG. 12 is an electrical schematic diagram of a voltage converter according to yet another embodiment of the present invention.

A voltage converter 1000 is shown in FIG. 12 according to yet another embodiment of the present invention. Like voltage converters 800 and 900, voltage converter 1000 may be substituted for circuit 400 in the system of FIG. 4.

Voltage converter 1000 includes a first inductor 1002 and a second inductor 1004 connected in series, the first and second inductors each having an input and an output. A first capacitor 1006 is electrically intermediate the first and second inductors 1002, 1004, a first terminal of the first capacitor being electrically connected to the output of the first inductor and a second terminal of the first capacitor being electrically connected to the input of the second inductor. A third inductor 1008 and a fourth inductor 1010 are connected in series, the third and fourth inductors each having an input and an output. A second capacitor 1012 is electrically intermediate the third and fourth inductors 1008, 1010, a first terminal of the second capacitor being electrically connected to the output of the third inductor and a second terminal of the second capacitor being electrically connected to the input of the fourth inductor. A first switch 1014 is coupled between the input of the first inductor 1002 and the output of the third inductor 1008. A second switch 1016 is coupled between the output of the first inductor 1002 and the input of the third inductor 1008. A rectifier 1018 is arranged such that an anode of the rectifier is electrically connected to the second terminal of the first capacitor 1006, a cathode of the rectifier being electrically coupled to the second terminal of the second capacitor 1012. A third switch 1020 is electrically connected in parallel with the rectifier 1018. Voltage converter 1000 is configured to receive a DC voltage signal at the inputs of the first and third inductors 1002, 1008 and to generate an AC voltage signal at the outputs of the second and fourth inductors 1004, 1010.

Voltage converter system 1000 may further include third capacitor 1022, the third capacitor being electrically intermediate the second and fourth inductors 1004, 1010. A first terminal of third capacitor 1022 is electrically connected to the output of the second inductor 1004 and a second terminal of the third capacitor is electrically connected to the output of the fourth inductor 1010.

The foregoing configuration of voltage converter system 1000 has the advantage of relatively low inductor current and a low switch current, similar to the embodiment of FIG. 5, since there are two input inductors (1002 and 1008) rather than the single input inductor of the previously-described configurations, and also has a low number of switches similar to the embodiment of FIG. 10. It should be noted that voltage converter system 1000 has more input current ripple compared to the embodiment of FIG. 5, as half of the input current is discontinuous because it flows through the switches, it is important in this embodiment that the switches switch synchronously to eliminate voltage transients across the switches and losses.

Inductors 1002, 1008 of voltage converter system 1000 may optionally be coupled magnetically to allow current balancing to occur. The current in inductor 1008 and switch 1014, and in inductor 1002 and switch 1016, may not necessarily ramp up identically as these inductor-switch pairs are independent of one another. However, when switches 1014, 1016 are opened the current flows in a complete circuit through the output (i.e., "a" and "b" of FIG. 12) so the current in inductors 1002, 1008 must be substantially the same. Any error will result in the energy being dumped in the switches 1014, 1016 until the currents are substantially the same. If the windings 1002, 1008 are coupled the energy can transfer between the windings until the currents are substantially the same rather than the energy being lost.

In some embodiments of the present invention certain inductors of voltage converter system 1000 may be wound upon a common core. For example, inductors 1002, 1008 may be wound upon a common core. Similarly, inductors 1004, 1010 may be wound upon a common core. Winding the inductors upon a common core may provide certain advantages, such as a reduction in the overall size of the inductors.

One skilled in the art will appreciate that any suitable electronic components may be utilized for the circuits shown in the accompanying figures and described herein. For example, the switches may be any suitable types of power switching components including, without limitation, semiconductors such as bipolar junction transistors, field effect transistors and thyristors. Likewise, the diodes, capacitors, inductors and transformers shown in the accompanying figures may be any suitable types and values for a particular realization of the circuitry.

In addition, the circuits shown in the accompanying figures are simplified for purposes of explanation and are not intended to be limiting in any way. Accordingly, the circuits may include any suitable number and type of ancillary components including, without limitation, biasing, feedback and filtering components and circuitry as well as analog and/or digital monitoring, feedback and control circuitry.

While this invention has been shown and described with respect to a detailed embodiment thereof, it will be understood by those skilled in the art that changes in form and detail thereof may be made without departing from the scope of the claims of the invention.

What is claimed is:
1. A voltage converter system comprising:
a first voltage converter portion, configured to receive a DC voltage signal and convert the DC voltage signal to pulses of DC voltage;
and a second voltage converter portion, configured to receive the pulses of DC voltage and convert the pulses of DC voltage to an AC voltage signal;
wherein the first voltage converter portion comprises:
a Ćuk-type voltage converter, and a single-ended primary inductor converter (SEPIC) voltage converter, the Ćuk-type voltage converter and the SEPIC voltage converter being electrically combined to operate cooperatively;

further wherein a switch and an inductor are common to both the Ćuk-type voltage converter and the SEPIC voltage converter.

2. A voltage converter system comprising:

a first voltage converter portion, configured to receive a DC voltage signal and convert the DC voltage signal to pulses of DC voltage;

and a second voltage converter portion, configured to receive the pulses of DC voltage and convert the pulses of DC voltage to an AC voltage signal;

wherein the first voltage converter portion comprises:
  a Ćuk-type voltage converter having two input terminals and an inverting output terminal;
  a SEPIC voltage converter having two input terminals and a non-inverting output terminal;
  a voltage converter system input terminal pair comprising the respective input terminals of the Ćuk-type voltage converter connected in parallel to the SEPIC voltage converter;
  and a voltage converter system output terminal pair comprising the inverting output terminal of the Ćuk-type voltage converter and the non-inverting output terminal of the SEPIC voltage converter.

3. A voltage converter system, comprising:

a first voltage converter portion, configured to receive a DC voltage signal and convert the DC voltage signal to pulses of DC voltage;

and a second voltage converter portion, configured to receive the pulses of DC voltage and convert the pulses of DC voltage to an AC voltage signal;

wherein the first voltage converter portion comprises:
  an input stage comprising,
    a first input terminal connected to a first end of a first inductor and a second input terminal connected to a first end of a switch,
    a second end of the first inductor connected to a second end of the switch at a first node;
  the input stage being common to,
    a Ćuk-type voltage converter having an inverting output terminal,
    and a SEPIC voltage converter having a non-inverting output terminal;
  and an output terminal pair comprising the inverting output terminal of the Ćuk-type voltage converter and the non-inverting output terminal of the SEPIC voltage converter.

4. The voltage converter system of claim 3 further comprising:

the first inductor comprising a primary stage of a transformer;

a secondary stage of the transformer having first and second terminals,
  the second terminal connected to the inverting output terminal of the Ćuk-type voltage converter at a second node;

the first terminal of the secondary stage of the transformer being connected to an anode of a first diode;

a cathode of the first diode being connected to a first end of a second inductor at a third node;

an anode of a second diode being connected to the second node;

a cathode of the second diode being connected to the third node;

a second end of the second inductor being connected to the non-inverting output terminal of the SEPIC voltage.

5. The voltage converter system of claim 4 further comprising:

the first terminal of the secondary stage of the transformer being polarity-matched to the first input terminal of the input stage.

* * * * *